United States Patent
Orlik et al.

(10) Patent No.: US 7,496,153 B2
(45) Date of Patent: Feb. 24, 2009

(54) MODULATING SIGNALS FOR COHERENT AND DIFFERENTIALLY COHERENT RECEIVERS

(75) Inventors: Philip Orlik, Cambridge, MA (US); Andreas F. Molisch, Arlington, MA (US); Sandeep Aedudodla, Gainesville, FL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 841 days.

(21) Appl. No.: 10/964,918

(22) Filed: Oct. 14, 2004

(65) Prior Publication Data

US 2006/0083333 A1    Apr. 20, 2006

(51) Int. Cl.
    *H04B 1/00*    (2006.01)
(52) U.S. Cl. .................... 375/308; 375/138; 375/146
(58) Field of Classification Search ........... 375/138, 375/146, 308
See application file for complete search history.

(56) References Cited

U.S. PATENT DOCUMENTS

| | | | | |
|---|---|---|---|---|
| 5,706,313 | A * | 1/1998 | Blasiak et al. | 375/330 |
| 6,388,587 | B1 * | 5/2002 | Brickner et al. | 341/59 |
| 2001/0053175 | A1 * | 12/2001 | Hoctor et al. | 375/130 |
| 2003/0108133 | A1 * | 6/2003 | Richards | 375/351 |
| 2004/0190596 | A1 * | 9/2004 | Lehmann et al. | 375/138 |
| 2004/0190641 | A1 * | 9/2004 | Ojard | 375/261 |
| 2005/0271120 | A1 * | 12/2005 | Hoctor | 375/138 |

OTHER PUBLICATIONS

Hoctor, "Delay-Hopped Transmitted-Reference RF Communications," IEEE Conference on Ultra Wide Band Width Systems and Technologies, 2002, pp. 265-269.*
Nakache "Spectral shape of UWB signals—influence of modulation format, multiple access scheme and pulse shape", The 57th IEEE Semiannual Vehicular Technology Conference, 2003. VTC 2003-Spring. vol. 4, Apr. 22-25, 2003 pp. 2510-2514 vol. 4.*
Complextoreal.com, "differential encoding", 4 pages 2001, http://www.complextoreal.com/diffcod.htm.*
IEEE802.11,"wireless LAN Medium Access Control (MAC) and Physical Layer (PHY) Specifications", IEEE 1999 p. 217.*
K.Witrisal, M.Pausini and A.Trindade, "Multiuser Interference and Inter-Frame Interference in UWB Transmitted reference Systems" ; May 18, 2004, pp. 96-100.
M. Win and R. A. Scholtz, *Ultra-Wide Band Width Time-Hopping Spread-Spectrum Impulse Radio for Wireless Multiple-Access Communications*," in IEEE Trans. On Communications, vol. 48, No. 4 Apr. 2000, pp. 679-691.

* cited by examiner

*Primary Examiner*—Juan A. Torres
(74) *Attorney, Agent, or Firm*—Dirk Brinkman; Clifton D. Mueller; Gene Vinokur

(57) ABSTRACT

A system incorporates time-hopped and transmitted-reference transceivers in the same wireless network. A transmitter modulates a sequence of bits in a wireless communications network by generating a reference waveform and a data waveform of a waveform pair for each current bit. The phase of the reference waveform depends on a previous modulated bit, and a difference in phase between the reference waveform and the data waveform pair depend on the current bit.

16 Claims, 9 Drawing Sheets

200

500

700

MODULATING SIGNALS FOR COHERENT AND DIFFERENTIALLY COHERENT RECEIVERS

FIELD OF THE INVENTION

The invention relates generally to communication systems, and more particularly to modulation formats used in wireless communication systems.

BACKGROUND OF THE INVENTION

In the United States, the Federal Communications Commission (FCC) allows a restricted unlicensed use of ultra-wide bandwidth (UWB) signals for wireless communication systems, "First Report and Order," Feb. 14, 2002. The UWB signals must be in the frequency range from 3.1 to 10.6 GHz, and have a minimum bandwidth of 500 MHz. The FCC order also limits the power spectral density and peak emissions power of UWB signals, e.g. less than −43.1 dBm/MHz.

One modulation method for UWB uses extremely short time pulses to generate signals with bandwidths greater than 500 MHz, e.g., 1/1,000,000,000 of a second of less, which corresponds to a wavelength of about 300 mm. Systems that use short pulses are commonly referred to as impulse radio (IR) systems.

As shown in FIG. 1A, four different modulation techniques can be used for wireless communication systems, pulse position modulation (PPM) 11, pulse amplitude modulation (PAM) 12, on-off keying (OOK) 13, and bi-phase shift keying (BPSK) 14.

As an advantage, UWB systems can achieve high data rates, and are resistant to multi-path impairments due to the large processing gains. Additionally, the use of IR based UWB technology allows for the implementation of low cost, low duty cycle, low power transceivers that do not require local oscillators for heterodyning. Because UWB radios are primarily digital circuits, they can easily be integrated in a semiconductor chip. In UWB systems, multiple users can simultaneously share the same spectrum with no interference to one another, and are ideal for high-speed home and business networking devices, as well as sensor networks.

In a sensor network, it is desirable to enable the direct communication among multiple inexpensive sensing devices. The IEEE 802.15.4a standard defines a physical-layer for communications with scalable data rates from 1 kbs to 1 Mbps, "IEEE P802.15.4a WPAN Alternate PHY-PAR," 2003, for low power, low data rate network.

Generally, IR systems are either time-hopped (TH-IR), or transmitted-reference (TR-IR). Both systems use sequences of short duration pulses, p(t). However, the modulation and demodulation for TH-IR and TR-IR differ significantly, making TH-IR and TR-IR incompatible in the same network.

TH-IR system are described by M. Win and R. A. Scholtz, "*Ultra-Wide Band Width Time-Hopping Spread-Spectrum Impulse Radio for Wireless Multiple-Access Communications*," in IEEE Trans. On Communications, Vol. 48, No. 4 April 2000, pp. 679-691. In a TH-IR system, each bit or symbol is represented by $N_f$ pulses, where $N_f$ is a positive integer. The time taken to transmit the bit is $T_s$. This is called the symbol duration. The time $T_s$ is further partitioned into frames $T_f$, and the frames are partitioned into chips $T_c$ corresponding typically to a pulse duration. If $N_c$ represents the number of chips in a frame and $N_f$ represents the number of frames in a symbol, then $T_s$, $T_f$, and $T_c$ are related as follows $$T_s = N_f T_f = N_f N_c T_c. \tag{1}$$

FIG. 1B shows the relationship the symbol time $T_s$ 101, the frame time $T_f$ 102, and the chip time $t_c$ 103 for pulses 104 for an example prior art TH-IR waveform 110 for a '0' bit, and a waveform 120 for a '1' bit. Typically, the pulses are spaced pseudo-randomly among the available chips in a frame according to a "time-hopping" code to minimize the effect of multi user interference.

As stated above, the modulation can be binary phase shift keying. With BPSK, each bit b is represented as either a positive or negative one $b \in \{-1,1\}$. The transmitted signal has the form $$s(t) = \sum_{i=1}^{\infty} \sum_{j=1}^{N_f} h_{i,j} b_{\lfloor i/N_f \rfloor} p(t - jT_f - c_j T_c), \tag{2}$$

where $c_j$ represents the $j^{th}$ value of the TH code, in the range $\{0, 1, \ldots, N_c-1\}$, and b is the $i^{th}$ modulation symbol. Additionally, an optional sequence denoted as $h_{i,j}$ can be applied to each pulse in the transmitted signal so as to shape the spectrum of the transmitted signal and to reduce spectral lines. The sequence, $h_{i,j}$, is called a polarity scrambling sequence with values of either +1 or −1. Different amplitudes are possible to give further degrees of freedom in the shaping of the spectrum.

FIG. 2 shows a conventional coherent TH-IR receiver 200. The receiver includes an automatic gain control (AGC) unit 210 coupled to an amplifier 220 that is connected to the receive antenna 230. The receiver also includes synchronization 240, timing control 250, channel estimation 260, MMSE equalizer 270, and decoder 280 units. Rake receiver fingers 290 input to an adder 295. Each rake finger includes a pulse sequence generator, correlator and weight combiner. The rake fingers reduce multipath interference. Due to the density of the multipaths in UWB signals, the number of required RAKE fingers can be large to obtain reasonable performance. The output of the adder is equalized and decoded. The typical TH-IR receiver has a significant complexity.

TR-IR systems eliminate the need for a RAKE receiver, R. Hoctor and H. Tomlinson, "*Delay-Hopped Transmitted-Reference RF Communications*," IEEE Conference on Ultra Wide Band Width Systems and Technologies, 2002, pp. 265-269." In a TR-IR system, the information is encoded as phase differences of successive pulses in the sequence. Each symbol in a TR-IR system is a sequence of time-hopped 'doublets' or pair of two consecutive pulses. Typically, the first pulse in the pair is referred to as a reference pulse and the second pulse is referred to as a data pulse. The two pulses in each pair are separated by a fixed unit of time $T_d$. Multiple pairs can be transmitted for one information bit. The transmitted waveform has the form $$s(t) = \sum_{i=0}^{\infty} \sum_{j=\frac{iN_f}{2}}^{(i+1)\frac{N_f}{2}-1} h_{i,j} \left( p(t - 2jT_f - c_j T_c) + b_{\lfloor 2j/N_f \rfloor} p(t - 2jT_f - c_j T_c - T_d) \right), \tag{3}$$

where $T_f$, $T_c$, $h_{i,j}$ and $N_f$ are the same as for the TH-IR case.

FIG. 3 shows the relationship the symbol time $T_s$ 301, the frame time $T_f$ 302, and the chip time $T_c$ 303 for pulses 304 for an example TH-IR waveform 310 for a '0' bit, and waveform 320 for a '1' bit.

FIG. 4 shows a conventional TR-IR receiver 400, which is significantly simpler than the TH-IR receiver of FIG. 2. The receiver includes delay 401, multiplier 402, integrator 403, sampler 407 and decision 404 units. The receiver essentially correlates the received signal 405 with a delayed version 406. Obviously, the TR-IR 400 receiver is less complex than the TH-IR receiver 200. However, the reduced complexity is at the cost of requiring twice the number of pulses, and the additional energy required for the reference pulses, nominally 3 dB or more.

It is clear that the decision to use either TH-IR or TR-IR modulation leads to incompatible system structures. Therefore, it is desired to provide a system structure that works with both TH-IR and TR-IR transceivers, to enable cost, complexity and performance trade-offs within a common wireless network.

SUMMARY OF THE INVENTION

The invention provides a system and method for incorporating TH-IR and TR-IR transceivers in the same wireless network. The invention also provides a modulation format that encodes information bits is such a way to enable both TH-IR and TR-IR receivers to demodulate the same signals. In addition, the modulation format does not suffer from the inherent 3 dB loss when the TH-IR receiver is used. The invention can be applied to narrow band, wide band, and ultra-wide band radio systems.

More specifically, a method modulates a sequence of bits in a wireless communications network by generating a reference waveform, e.g., a pulse, and a data waveform, e.g., another pulse, of a waveform pair for each current bit. The phase of the reference waveform depends on a previously modulated bit, and a difference in phase (polarity) between the reference waveform and the data waveform pair depend on the current bit.

DETAILED DESCRIPTION OF THE PREFERRED EMBODIMENT

Our invention provides a system and method that enables both TH-IR and TR-IR transceivers to co-exist in the same wireless network. Our idea is based on our observation that TR-IR systems encode an information bit as a phase difference between a reference pulse and a data pulse. Furthermore, the polarity of the reference pulse is inconsequential for the correct operation of the TR-IR system.

Therefore, we encode redundant information in the reference pulses so that a TH-IR receiver can decode the information with improved performance, while maintaining the required phase difference or polarity so that a TR-IR can also decode the information. We call this modulation 'hybrid-IR' (H-IR).

Figure 5:
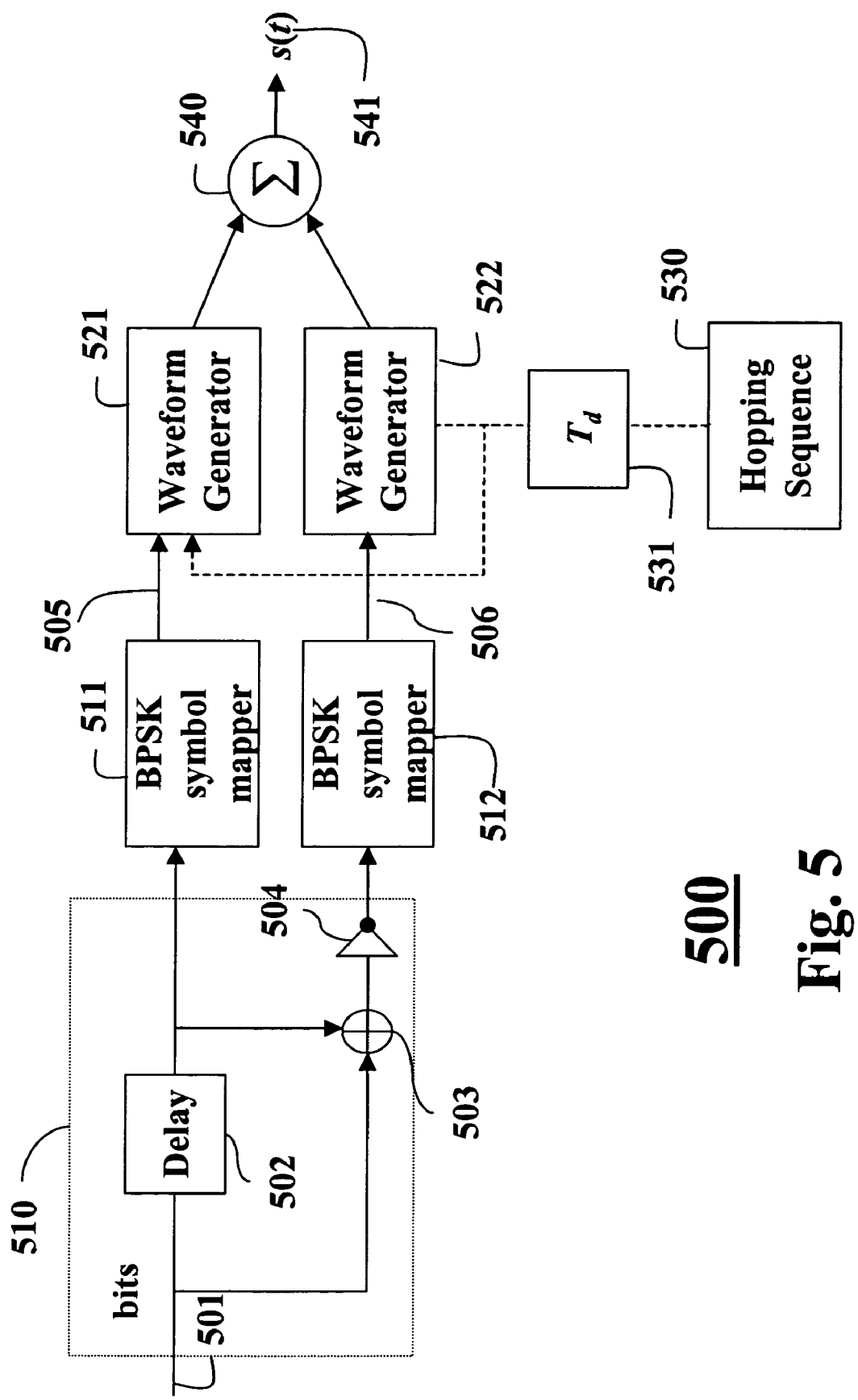
FIG. 5 is a block diagram of a hybrid-IR transmitter according to the invention.

FIG. 5 show a H-IR transmitter 500 according to the invention. The transmitter includes a pre-processor 510 for input bits 501. The pre-processor includes a delay 502 and an adder 503. The adder sums each input bit 501 to a delayed version of the bit, the sum is inverted 504.

The pre-processing generates a pair of modulating bits from two successive information bits. It should be noted that more than one pair of modulation bits can be used for each information bit. During each symbol period, the symbols are modulated 511-512. Reference waveforms, e.g., pulses 505, in the sequence are BPSK modulated 511 according to the input bits 501, and data waveforms, e.g., pulses 506, are BSPK modulated according to the inverted sum. Waveform generators 521-522 are applied, according to a hopping sequence 530 and delay $T_d$ 531 and the results are combined 540.

The transmitted signal, s(t) 541, can be expressed as $$s(t) = \sum_{i=0}^{\infty} \sum_{j=\frac{iN_f}{2}}^{(i+1)\frac{N_f}{2}-1} b_{\lfloor 2j/N_f \rfloor - 1} p(t - 2jT_f - c_j T_c) + \quad (4)$$

$$(\overline{b_{\lfloor 2j/N_f \rfloor - 1} \oplus b_{\lfloor 2j/N_f \rfloor}}) p(t - 2jT_f - c_j T_c - T_d).$$

The modulation according to equation (4) shows that a phase difference between the reference pulse and data pulse is identical to a conventional TR-IR system. Table A shows the four possible combinations of a previous and a current bit, the corresponding values of the reference and data waveforms, and their phase differences or polarities.

TABLE A

| Previous bit | Current bit | Reference pulse modulation symbol $b_{\lfloor 2j/N_f \rfloor - 1}$ | Data pulse modulation symbol $\overline{b_{\lfloor 2j/N_f \rfloor - 1} \oplus b_{\lfloor 2j/N_f \rfloor}}$ | Phase difference between reference pulse and modulated pulse |
|---|---|---|---|---|
| 0 | 0 | −1 | 1 | 180° |
| 0 | 1 | −1 | −1 | 0° |
| 1 | 0 | 1 | −1 | 180° |
| 1 | 1 | 1 | 1 | 0° |

If the current bit is 0, then the phase difference between the reference pulse and the data pulse is always 180° regardless of the value of the previous bit. If the current bit is 1, then the phase difference is 0°.

It should be clear that a TR-IR receiver can demodulate the signal according to the invention. However, the signal can also be demodulated by a TH-IR receiver with improved performance. The gain in performance is based on the fact that information is encoded in both the reference pulses and the data pulses. Thus, the TH-IR receiver can use the energy in the reference pulses to make decisions on the values of the transmitted bits, see Table A. During each symbol period, a sequence of $N_f/2$ pairs is transmitted. The pair in each frame is described as a sequence of pulses, each with a polarity of the pulses depending on the current and previous bit that are transmitted. There are four possible combinations of pairs.

$$s_0(t) = -1 * \frac{1}{\sqrt{N_f E_p}} p(t) + 1 * \frac{1}{\sqrt{N_f E_p}} p(t - T_d) \quad (5)$$

$$s_1(t) = -1 * \frac{1}{\sqrt{N_f E_p}} p(t) - 1 * \frac{1}{\sqrt{N_f E_p}} p(t - T_d)$$

$$s_2(t) = -1 * \frac{1}{\sqrt{N_f E_p}} p(t) - 1 * \frac{1}{\sqrt{N_f E_p}} p(t - T_d)$$

$$s_3(t) = -1 * \frac{1}{\sqrt{N_f E_p}} p(t) + 1 * \frac{1}{\sqrt{N_f E_p}} p(t - T_d)$$

The coefficient $$\frac{1}{\sqrt{N_f E_p}}$$

in equations normalizes the transmitted symbol to unit energy, where $E_p$ is the energy of the pulse, and $N_f$ is the number of pulses in a symbol. Note that this set of four signals can be described with two orthogonal basis functions $\Psi_0$ and $\Psi_1$. We select $$\psi_0(t) = \frac{1}{\sqrt{N_f E_p}} p(t) \text{ and } \psi_1(t) = \frac{1}{\sqrt{N_f E_p}} p(t - T_d) \quad (6)$$

as the basis functions. Then, we can express the four possible pairs as $$s_0(t) = -1 * \Psi_0(t) + 1 * \Psi_1(t),$$

$$s_1(t) = -1 * \Psi_0(t) - 1 * \Psi_1(t),$$

$$s_2(t) = 1 * \Psi_0(t) - 1 * \Psi_1(t), \text{ and}$$

$$s_3(t) = 1 * \Psi_0(t) + 1 * \Psi_1(t). \quad (7)$$

We can also represent the signals as a vector $$s_0 = [-1, 1]$$

$$s_1 = [-1, -1]$$

$$s_2 = [1, -1]$$

$$s_3 = [1, 1].$$

Therefore, the transmitted signal can be described as follows. During each symbol period, the transmitter transmits a sequence of $N_f/2$ pairs. The four possible pairs are given by equation (7). The pairs are optionally time hopped and scrambled with a polarity code.

As an advantage, the invention provides a modulation format with memory. Modulation formats that have memory can be represented by a trellis diagram. Additionally, the transmitted signal is now a two-dimensional signal because two basis signals $\Psi_0(t)$ and $\Psi_1(t)$ are used to represent the pairs.

Figure 6:
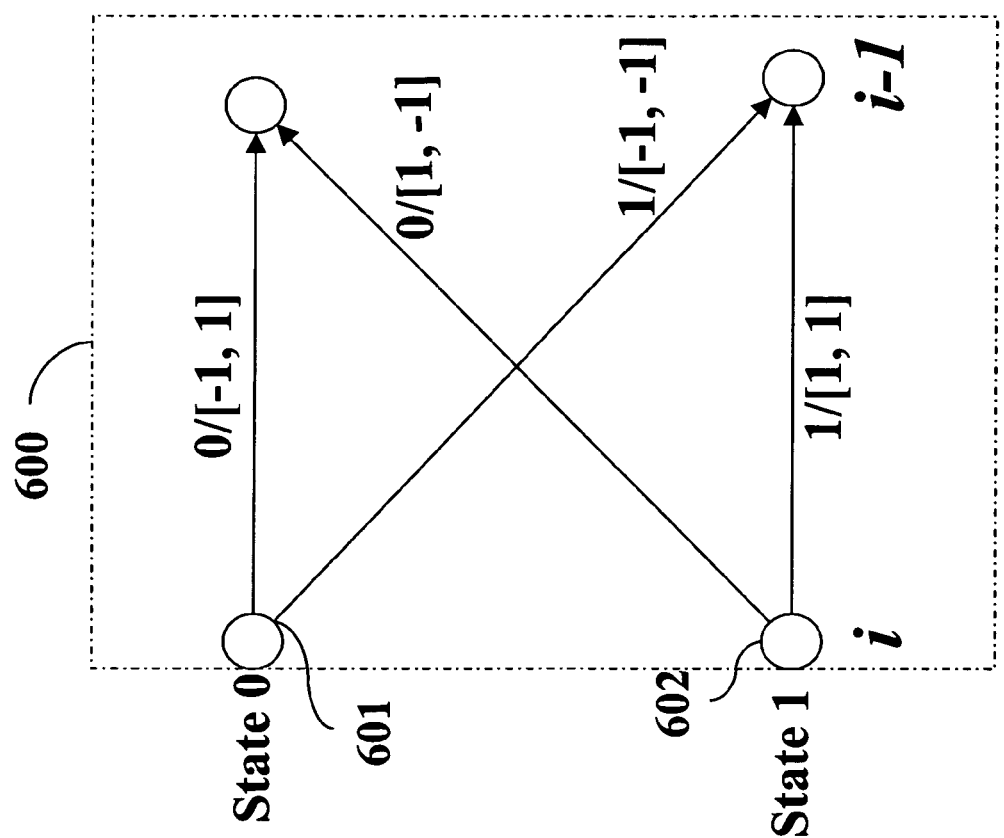
FIG. 6 is a trellis diagram of Viterbi decoder according to the invention.

FIG. 6 shows a diagram 600 for a Viterbi decoder using a trellis. The trellis has two states, where a state 0 601 is a value of a previous 0 bit, and state 1 602 is a value of a previous 1 bit. Branches of the trellis indicate possible transitions. The branches are labeled with the value of current bit, and the vector representation of the transmitted pair. For example, if the current state is 0 and a '1' bit is to be transmitted, then a transition to state 1 occurs, and pair $s_1 = [-1, -1]$ is transmitted.

With this interpretation of the hybrid-IR modulation, we see that a coherent TH-IR receiver can be used to demodulate the signal. Our TH-IR receiver is adapted to accommodate the two-dimensional description of the symbol waveform and the memory between consecutive symbols according to the invention.

Figure 7:
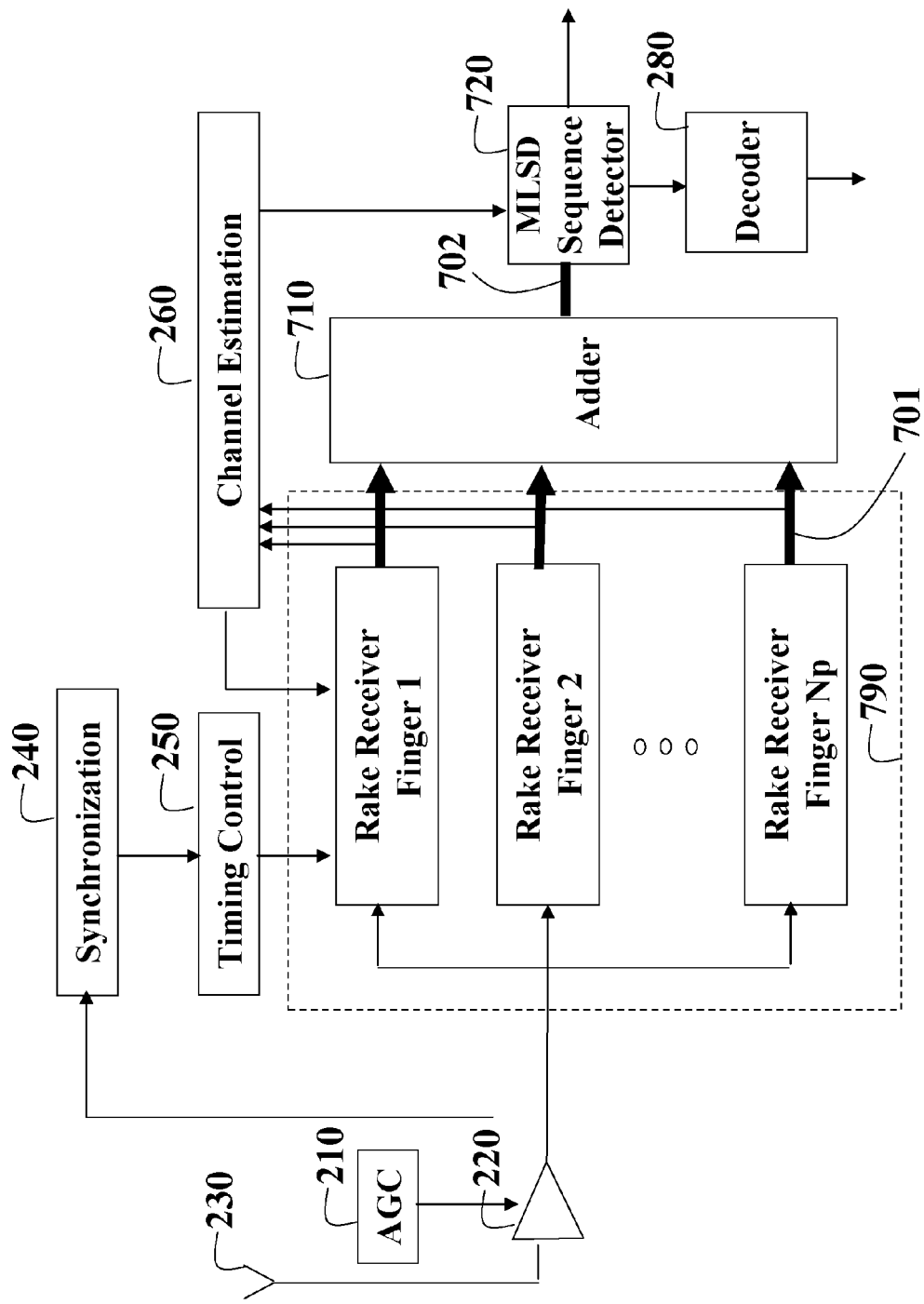
FIG. 7 is a block diagram of a hybrid-IR receiver according to the invention.

FIG. 7 shows the TH-IR receiver 700 according to the invention. As before, we use a RAKE structure 790. However, now the RAKE fingers correlate the incoming signal with sequences of the two basis pulses, $\Psi_0(t)$ and $\Psi_1(t)$. The output of each finger is now a 2-D vector 701. The outputs of the finger are summed 710 to produce a soft input observations 702 for a conventional maximum likelihood sequence detector (MLSD) 720. The MLSD detector determines a most probable path through the trellis 600 for a given sequence of observations 702. Methods that approximate the MSLD detector, such as Viterbi decoding can also be used.

Figure 8:
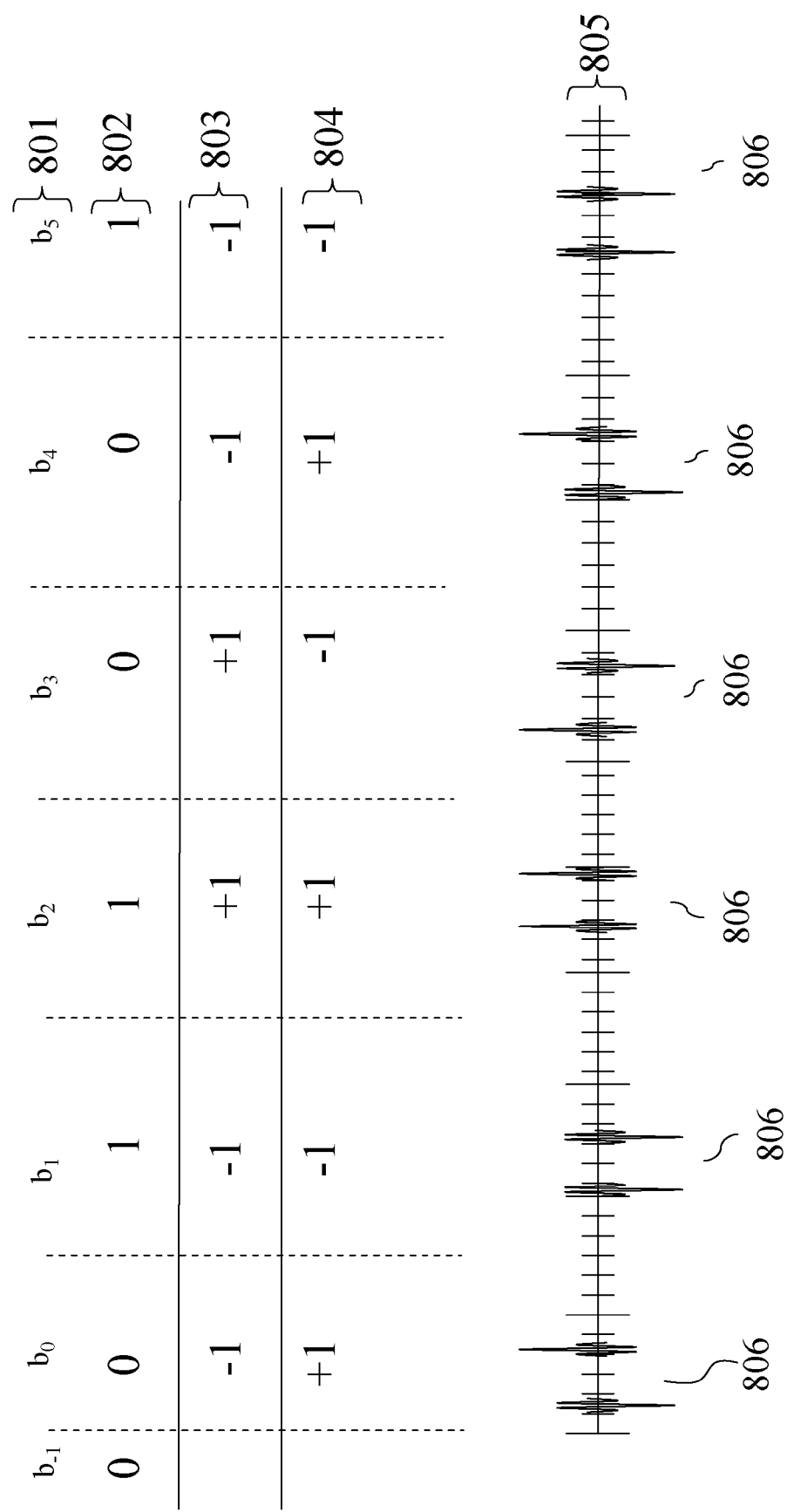
FIG. 8 is a diagram of hybrid-IR modulation according to the invention.

FIG. 8 shows the relationship between symbols, bits and modulated waveforms. The six symbols of the sequence 801 to be modulated are labeled $b_0$ to $b_5$, with a previous encoded symbol '0'. The symbols in the example sequence are $\{0, 1, 1, 0, 0, 1\}$ 802, which correspond to reference bits $\{-1, -1, +1, +1, -1, -1\}$ 803, and data bits $\{+1, -1, +1, -1, +1, -1\}$ 804, and a waveform 805 with reference and data pulse pairs 806, where a "down" pulse encodes '−1' and an 'up' pulse encodes '+1'.

From FIG. 8, we see that the waveform 805 has the properties described earlier. Specifically, the phase difference between the reference pulse and the data pulse in each pair 806 contains the information about the current bit being transmitted. For each pair the phase difference is 180° when a '0' bit is transmitted, and a 0° phase difference when a '1' bit is transmitted.

Additionally, the sequence of pairs also contains the information about the previous bit in the polarity of the reference pulse. Again, this is seen in FIG. 8, where the reference pulse in each pair has a +/− polarity that indicates the value of the previously encoded bit. That is, a positive polarity if the previous bit was a '1', and a negative polarity when the previous bit was a '0'. It should be understood, that the polarities can all be reversed to achieve the same result.

Figure 1A:
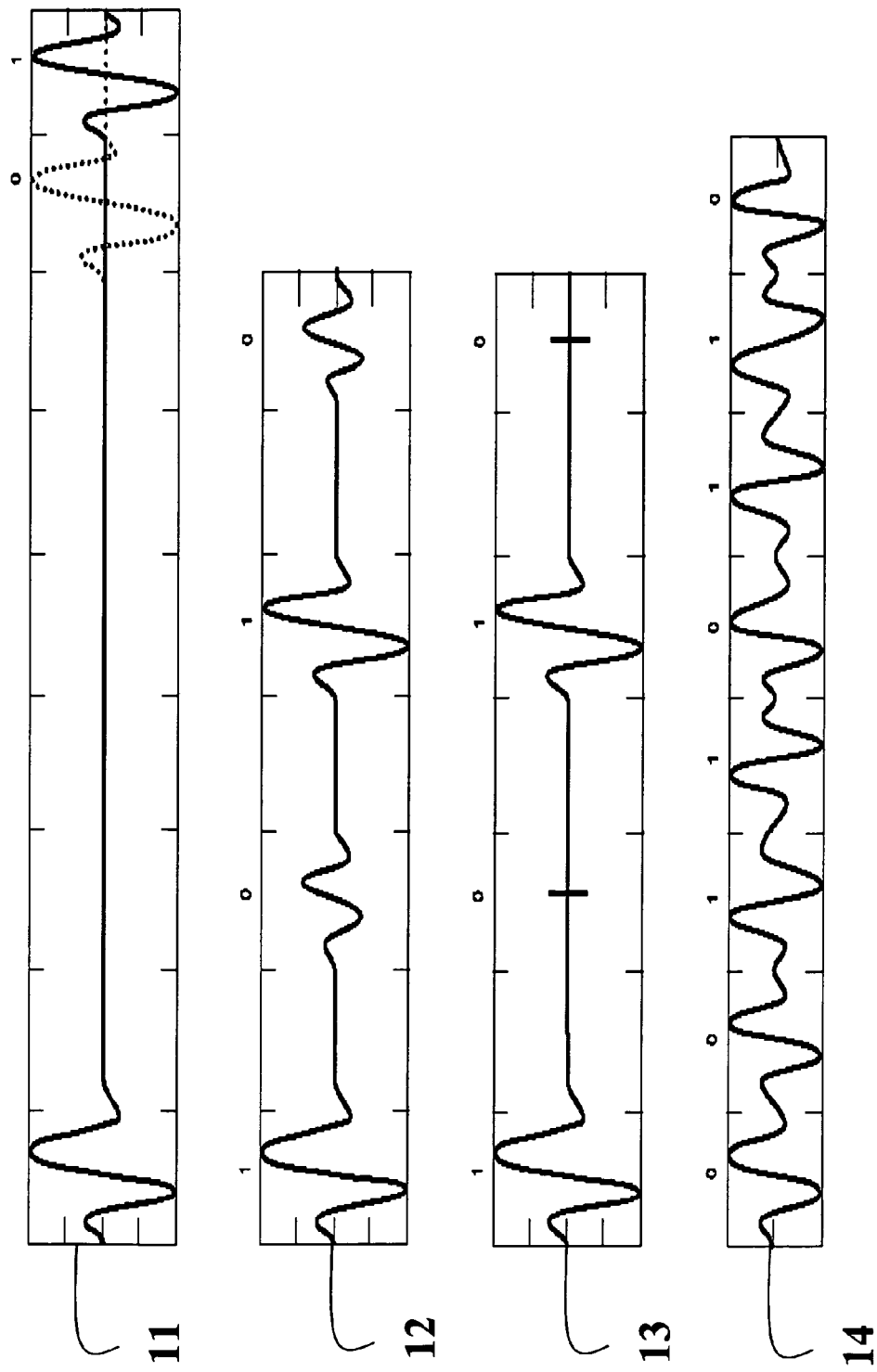
FIG. 1A is a timing diagram of prior art modulation techniques.
Figure 1B:
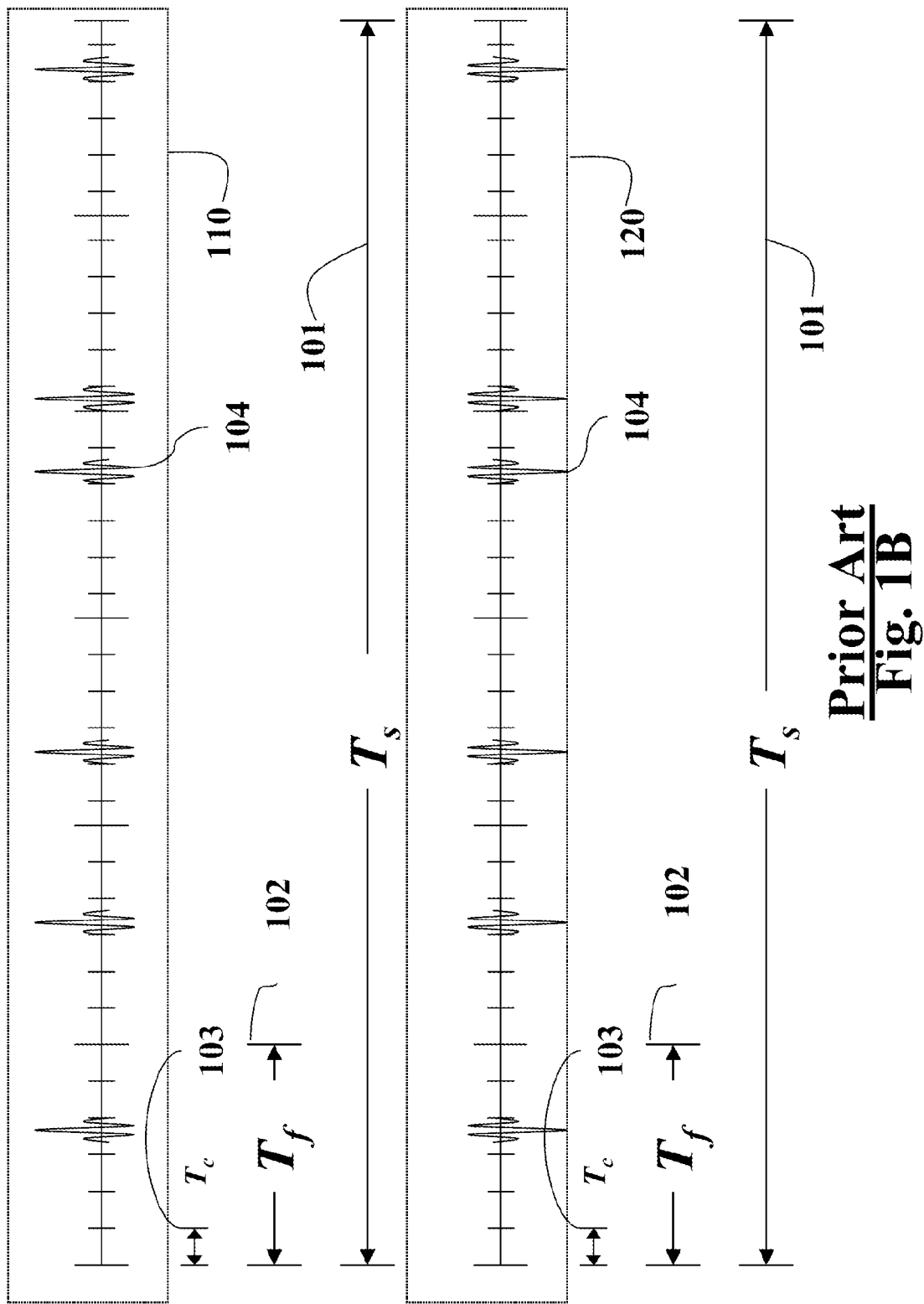
FIG. 1B is a timing diagram of prior art TH-IR modulation.
Figure 2:
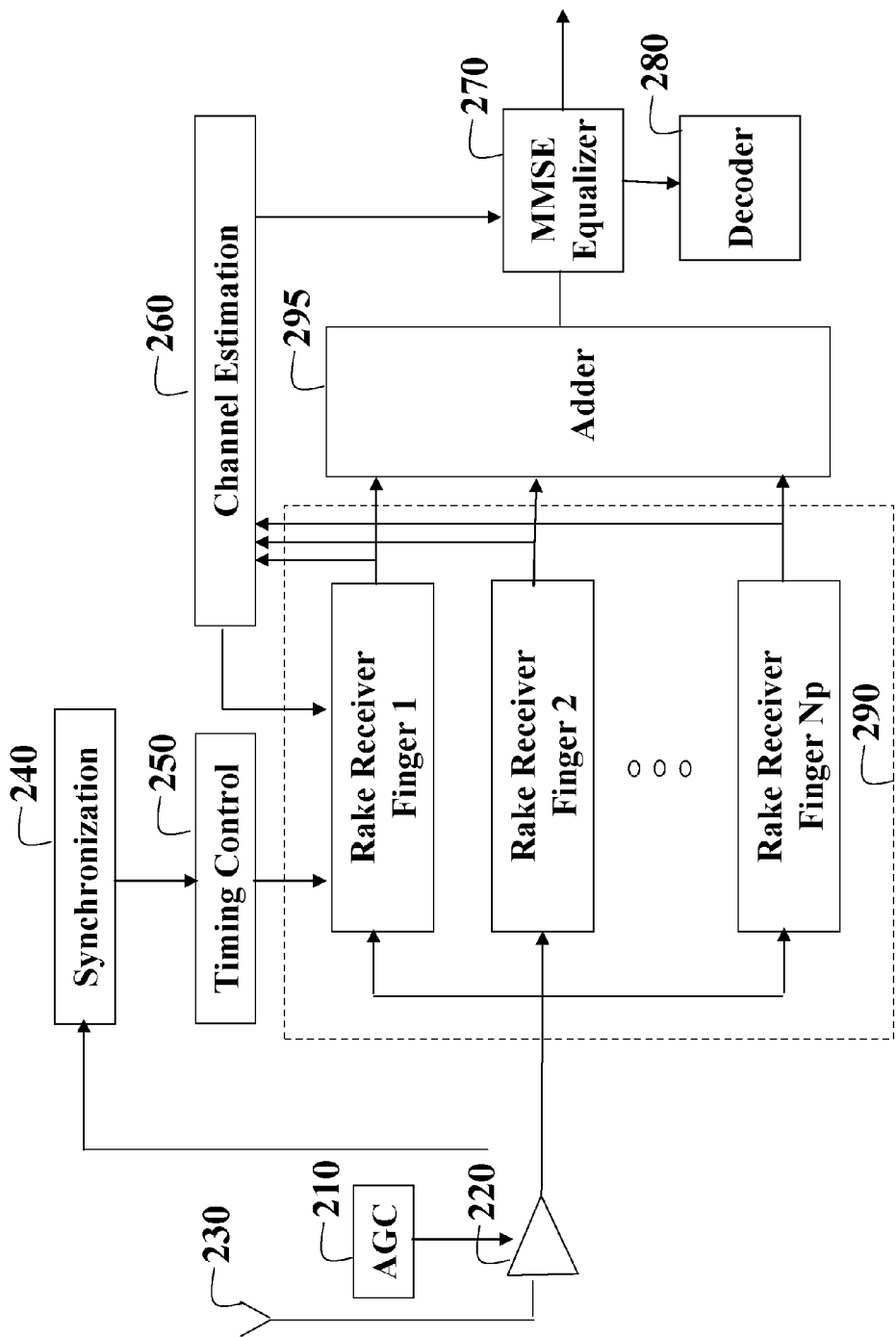
FIG. 2 is a block diagram of a prior art TH-IR receiver.
Figure 3:
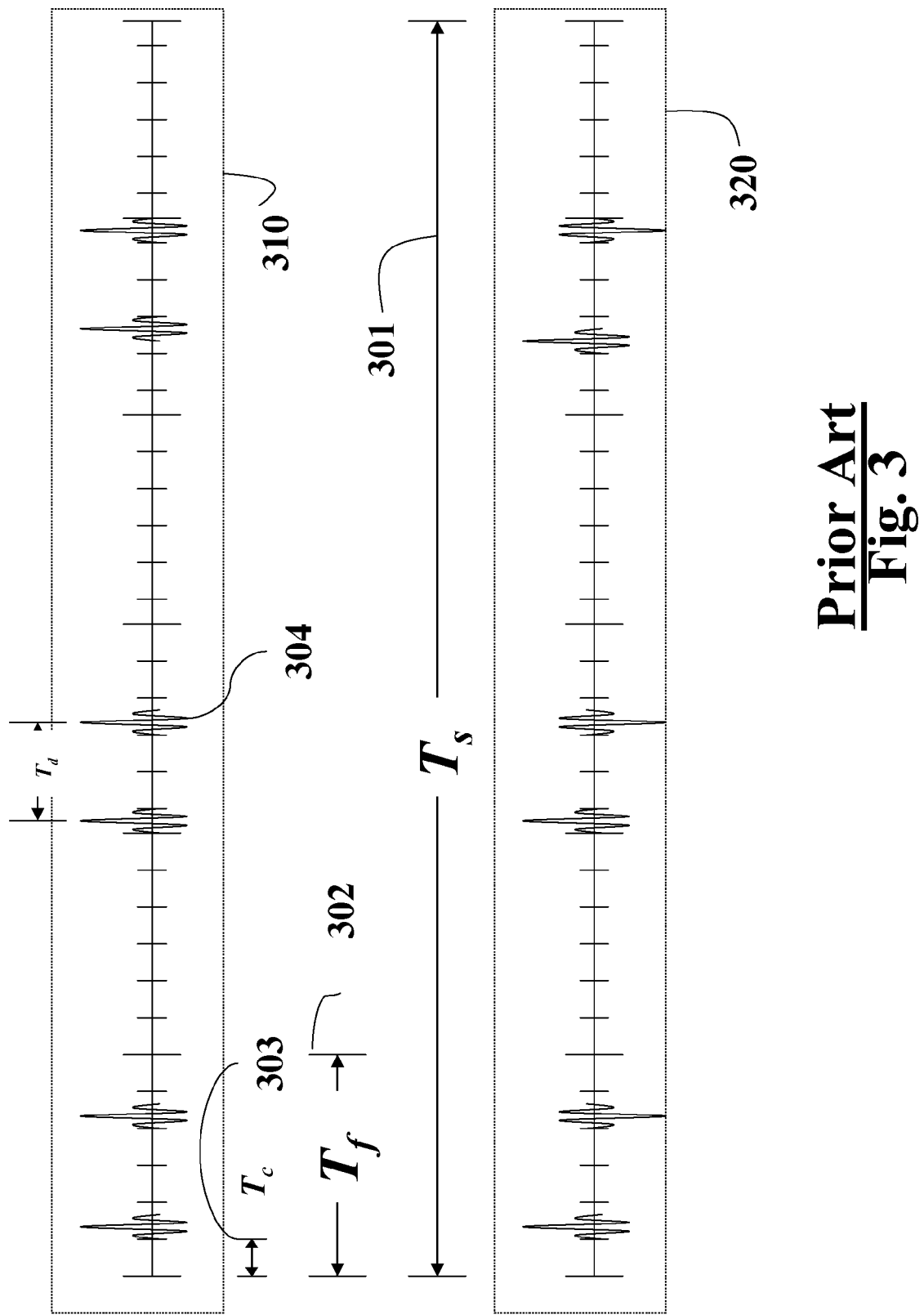
FIG. 3 is a timing diagram of prior art TR-IR modulation.
Figure 4:
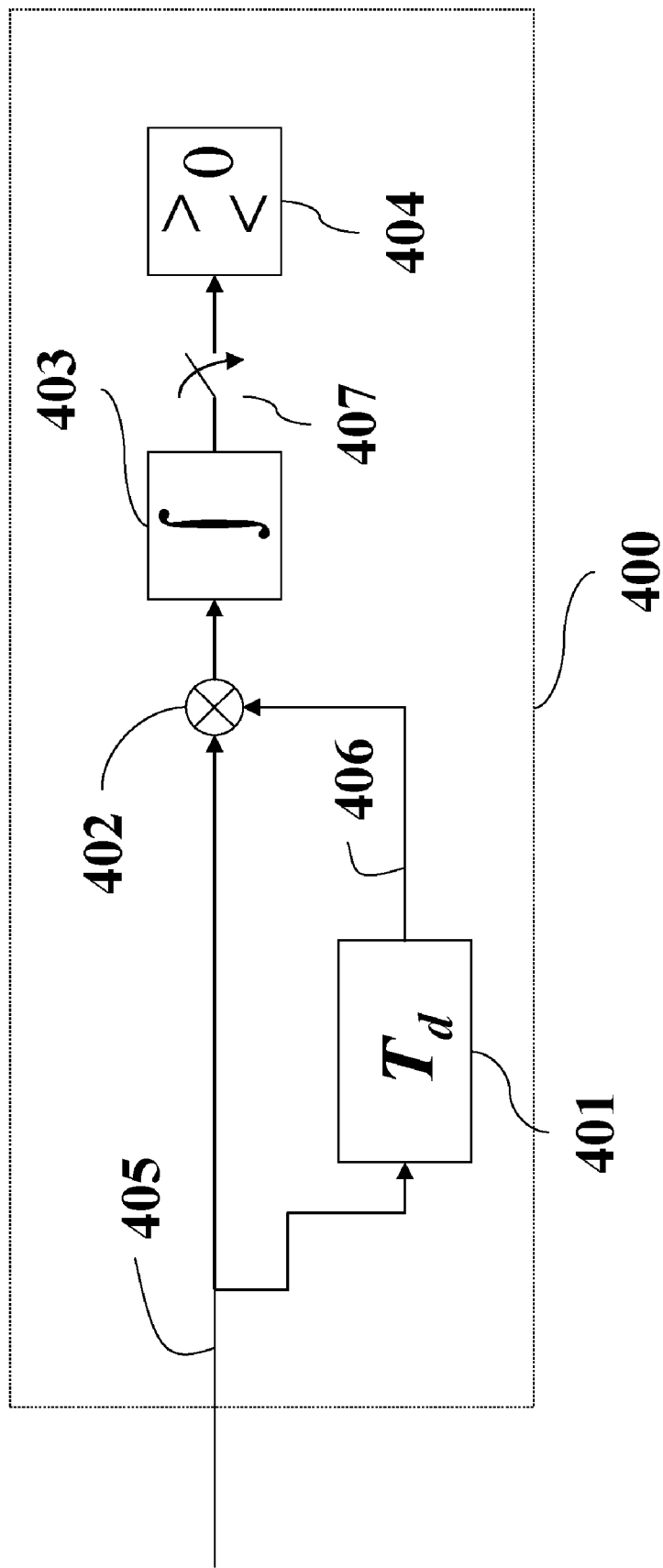
FIG. 4 is a block diagram of a prior art TR-IR receiver.

This waveform, therefore, enables the use of both coherent and differentially coherent receivers, as depicted in FIGS. 4 and 7 respectively, in the same network. The choice of receiver can be based on considerations such as required performance, cost of implementation, or desired transmission distance. Generalization, to the case when multiple pairs are used to transmit a symbol, is straightforward. In this case each pair is repeated a number of times, and a polarity scrambling code can be used to improve the spectral characteristics of the waveform.

Effect of the Invention

The modulation format according to the invention can be demodulated by coherent, RAKE TH-IR and a differentially coherent TR-IR receiver. The TH-IR receiver according to the invention has improved performance over prior art TH-IR receivers because information is also encoded in reference waveforms.

Although the example signals are for a UWB system, it should be understood that the invention can also be used for narrow band width wireless communication systems, and UWB systems that use waveforms other than pulses, CDMA, FSK, and PSK modulation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for modulating a sequence of bits in a wireless communications network, comprising:

generating a reference waveform of a waveform pair for each current bit, wherein a phase of the reference waveform depends on a previous bit; and generating a data waveform of the waveform pair for the current bit, wherein a difference in phase between the reference waveform and the data waveform in the waveform pair depend on the current bit, in which a transmitted signal s(t) corresponding to the waveform pair for bit $b_i$ is expressed as $$s(t) = \sum_{i=0}^{\infty} \sum_{j=\frac{iN_f}{2}}^{(i+1)\frac{N_f}{2}-1} b_{\lfloor 2j/N_f \rfloor - 1} p(t - 2jT_f - c_jT_c) + \overline{(b_{\lfloor 2j/N_f \rfloor - 1} \oplus b_{\lfloor 2j/N_f \rfloor})} p(t - 2jT_f - c_jT_c - T_d),$$

where $N_f$ is two, a time to transmit the bit is a symbol duration $T_s$, p is a pulse, and the symbol duration has a plurality of frames $T_f$, and each frame has a plurality of chips $T_c$, a chip corresponding to a pulse duration, and $N_c$ is a number of chips in each frame, and wherein $T_s = N_f T_f = N_f N_c T_c$, and each bit $b_i$ is represented as either a positive or negative one $b \in \{-1, 1\}$, and wherein $c_j$ represents a $j^{th}$ value of a code in a range $\{0, 1, \ldots, N_c-1\}$.

2. The method of claim 1, further comprising:

if the previous bit is 0 and the current bit is 0, then a polarity of the reference waveform is −1 and the phase of the data waveform is 1;

if the previous bit is 0 and the current bit is 1, then the polarity of the reference waveform is −1, and the phase of the data waveform is −1; and if the previous bit is 1 and the current bit is 0, then the polarity of the reference waveform is 1, and the phase of the data waveform is −1; and if the previous bit is 1 and the current bit is 1, then the polarity of the reference waveform is 1, and the phase of the data waveform is 1.

3. The method of claim 1, in which the reference waveform and the data waveform of the waveform pairs corresponding to the sequence of bits are received and correctly decoded by a time-hopped impulse radio receiver and a transmitted-reference impulse radio receiver in the wireless communications network.

4. The method of claim 3, in which the received waveform pair is decoded using a coherent receiver and sequence detector.

5. The method of claim 4, in which the sequence detector is Viterbi decoder.

6. The method of claim 4, in which the sequence detector is a maximum likelihood sequence detector.

7. The method of claim 1, in which the waveforms are generated by bi-phase shift keying.

8. The method of claim 1, in which multiple waveform pairs are generated for each bit.

9. The method of claim 1, in which the reference waveform and the data waveform are subject to a polarity scrambling sequence with values of +1 and −1.

10. The method of claim 1, further comprising:

if the current bit is 0, then the difference in phase between the reference waveform and the data waveform is always 180° regardless of a value of the previous bit; and if the current bit is 1, then the difference in phase is 0°.

11. The method of claim 1, in which each waveform is a pulse.

12. The method of claim 11, in which the wireless communications network uses ultra-wide bandwidth waveforms.

13. A system for modulating a sequence of bits in a wireless communications network, comprising:

means for generating a reference waveform of a waveform pair for each current bit, wherein a phase of the reference waveform depends on a previous modulated bit; and means for generating a data waveform of the waveform pair for the current bit, wherein a difference in phase between the reference waveform and the data waveform in the waveform pair depend on the current bit, and further comprising:

a transmitter for generating the waveforms, the transmitter further comprising:

a delay configured to receive the sequence of bits;

an adder configured to receive each current bit and each previous bit, and generating a sum;

an inverter configured to invert the sum;

a first modulator and waveform generator connected to the delay; and a second modulator and waveform generator connected to the inverter.

14. The system of claim 13, further comprising:
if the previous bit is 0 and the current bit is 0, then a polarity of the reference waveform is −1 and the phase of the data waveform is 1;
if the previous bit is 0 and the current bit is 1, then the polarity of the reference waveform is −1, and the phase of the data waveform is −1;
if the previous bit is 1 and the current bit is 0, then the polarity of the reference waveform is 1, and the phase of the data waveform is −1; and
if the previous bit is 1 and the current bit is 1, then the polarity of the reference waveform is 1, and the phase of the data waveform is 1.

15. The system of claim 13, in which the waveforms are generated by bi-phase shift keying.

16. The system of claim 13, in which the wireless communications network uses ultra-wide bandwidth signaling.

\* \* \* \* \*